(12) United States Patent
Ur et al.

(10) Patent No.: US 11,477,531 B1
(45) Date of Patent: Oct. 18, 2022

(54) MACHINE LEARNING SYSTEM, METHOD, AND COMPUTER PROGRAM TO PREDICT WHICH RESIDENT OF A RESIDENTIAL SPACE IS WATCHING TELEVISION FOR CONTENT TARGETING PURPOSES

(71) Applicant: Amdocs Development Limited, Limassol (CY)

(72) Inventors: Shmuel Ur, Shorashim (IL); Sarit Chehanowitz, Tel Aviv (IL); Nir Fattal, Yehud-Monosson (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/990,875

(22) Filed: Aug. 11, 2020

(51) Int. Cl.
| | |
|---|---|
| *H04N 21/45* | (2011.01) |
| *H04N 21/466* | (2011.01) |
| *H04N 21/25* | (2011.01) |
| *G06N 20/00* | (2019.01) |
| *H04N 21/458* | (2011.01) |
| *H04N 21/442* | (2011.01) |

(52) U.S. Cl.
CPC ......... *H04N 21/4667* (2013.01); *G06N 20/00* (2019.01); *H04N 21/251* (2013.01); *H04N 21/44222* (2013.01); *H04N 21/458* (2013.01); *H04N 21/4532* (2013.01); *H04N 21/4662* (2013.01)

(58) Field of Classification Search
None
See application file for complete search history.

(56) References Cited

U.S. PATENT DOCUMENTS

| | | | |
|---|---|---|---|
| 10,958,973 B2 * | 3/2021 | Hoots | H04N 21/25891 |
| 2011/0082824 A1 * | 4/2011 | Allison | G06N 20/00 706/20 |
| 2011/0083101 A1 * | 4/2011 | Sharon | H04W 4/029 709/204 |
| 2016/0212493 A1 * | 7/2016 | Phadnis | H04N 21/25891 |
| 2017/0245106 A1 * | 8/2017 | Connelly | H04L 65/762 |

* cited by examiner

*Primary Examiner* — Mulugeta Mengesha
*Assistant Examiner* — Charles N Hicks
(74) *Attorney, Agent, or Firm* — Zilka-Kotab, P.C.

(57) ABSTRACT

As described herein, a machine learning system, method, and computer program are provided to predict which resident of a residential space is watching television for content targeting purposes. In use, a login to a television service on a television device in a residential space is detected. Additionally, information defining a plurality of residents of the residential space is identified. Further, a profile determined for the login is identified, where the profile is associated with a particular resident of the plurality of residents or a particular resident group of the plurality of residents. Still yet, the profile and the information defining the plurality of residents of the residential space is input to a machine learning model to predict one or more residents of the plurality of residents that is consuming the television service on the television device.

13 Claims, 6 Drawing Sheets

MACHINE LEARNING SYSTEM, METHOD, AND COMPUTER PROGRAM TO PREDICT WHICH RESIDENT OF A RESIDENTIAL SPACE IS WATCHING TELEVISION FOR CONTENT TARGETING PURPOSES

FIELD OF THE INVENTION

The present invention relates to techniques for targeting content to users.

BACKGROUND

Content targeting is a process by which the relevancy of content to a user is used as a basis for providing or recommending the content to the user. Typically, the targeted content may include advertisements, media, offers, etc. Current content targeting techniques consider various types of information when determining the relevancy of content to a user. This information usually includes demographics of the user and past behavior (e.g. content consumption) by the user, but also usually includes the current content being consumed by the user, especially when the targeted content is planned to be provided to the user during (or shortly after) the current content being consumed.

However, when content is being viewed on a television of a residential space that is shared by multiple residents, it is unknown which resident (or residents) is consuming the content. This lack of user information restricts the content targeting process, as relevancy to demographics, etc. of the particular resident cannot be determined. There is thus a need for addressing these and/or other issues associated with the prior art.

SUMMARY

As described herein, a machine learning system, method, and computer program are provided to predict which resident of a residential space is watching television for content targeting purposes. In use, a login to a television service on a television device in a residential space is detected. Additionally, information defining a plurality of residents of the residential space is identified. Further, a profile determined for the login is identified, where the profile is associated with a particular resident of the plurality of residents or a particular resident group of the plurality of residents. Still yet, the profile and the information defining the plurality of residents of the residential space is input to a machine learning model to predict one or more residents of the plurality of residents that is consuming the television service on the television device.

DETAILED DESCRIPTION

Figure 1:
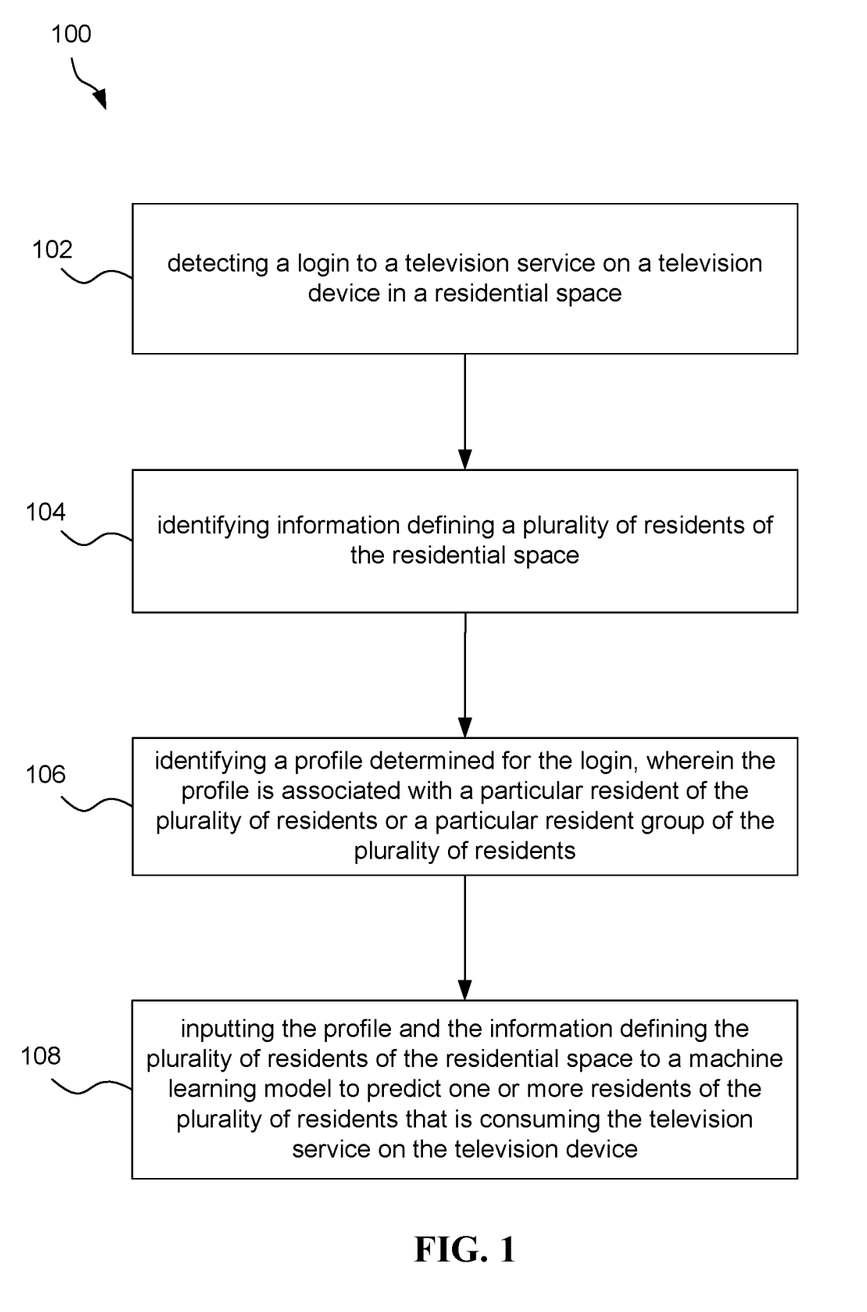
FIG. 1 illustrates a method for predicting which resident of a residential space is watching television, using a machine learning model, in accordance with one embodiment.

FIG. 1 illustrates a method 100 for predicting which resident of a residential space is watching television, using a machine learning model, in accordance with one embodiment. The method 100 may be performed by a computer system (e.g. server), such as that described below with reference to FIGS. 5 and/or 6. For example, the method 100 may be performed by the computer system of a communication service provider (CSP), in one embodiment. The CSP may provide both communication services like wireless, fixed home phone and broadband as well as television and media streaming services.

In operation 102, a login to a television service on a television device in a residential space is detected. The television service may be one provided by CSP, as noted above, for presenting, streaming, providing on-demand, etc. television content to users. Further, the television service may require a valid login prior to allowing access to television content. Valid logins may correspond to CSP accounts with existing subscriptions to the television service, or may correspond with guest logins (e.g. for persons in process of subscribing to the television service).

Optionally, a single CSP account with a subscription to the television service may have multiple different valid logins for the television service, each of which may be used by one or more residents of the residential space. For example, one login may be used by a particular adult, one login may be used by a combination of adults, one login may be used by a combination of children, etc. Each login may enable a corresponding profile to be generated for that login over time, and in turn content relevant to that profile to be recommended by the television service to residents that access the television service via the login.

In various embodiments, the login may be performed (by a resident of the residential space) through a television application or a set top box (STB) associated with the CSP. The login may include a username/password combination, or a selection of a unique identifier (e.g. login icon, login name, etc.).

Additionally, in operation 104, information defining a plurality of residents of the residential space is identified. In one embodiment, at least a portion of the information defining the residents may be stored by the CSP, such as in association with customer accounts. In another embodiment, at least a portion of the information defining the residents may be collected from one or more third party websites (e.g. via scraping social media websites, etc.). Just by way of example, the information defining the residents may include an identifier of each resident (e.g. name, family role, etc.), an age of each resident, a gender of each resident, etc.

Further, in operation 106, a profile determined for the login is identified, where the profile is associated with a particular resident or a particular resident group. As noted above, a profile may be generated for each login over time. In one embodiment, the profile may indicate a history of content viewed using the login to the television service.

Still yet, in operation 108, the profile and the information defining the plurality of residents of the residential space is input to a machine learning model to predict one or more residents of the plurality of residents that is consuming the television service on the television device. The machine learning model may be trained to use login profile information and resident information to predict which resident(s) of a residential space are watching a particular television device at any particular point in time.

In one embodiment, the machine learning model may assign the login to the particular resident or the particular resident group, based on the profile. For example, the viewing history indicated by the profile may be analyzed and determined to correspond to a single resident, such as where the viewing history follows a single pattern of a type of content watched. As another example, the viewing history indicated by the profile may be analyzed and determined to correspond to multiple residents (forming the resident group), such as where the viewing history follows multiple different patterns of types of content watched.

When the machine learning model assigns the login to the particular resident, the machine learning model may correlate the profile with one of the residents, based on the information defining the plurality of residents, to predict which one of the residents is consuming the television service on the television device. For example, the machine learning model may derive demographic information from the profile to correlate the profile with the one of the residents.

On the other hand, when the machine learning model assigns the login to the particular resident group, the machine learning model may determine a portion of the profile that is relevant to current content being presented through the television service, and may then correlate that portion of the profile with one of the residents in the particular resident group, based on the information defining the plurality of residents. This correlation may enable the machine learning model to predict which one of the residents is consuming the television service on the television device. For example, the machine learning model may derive demographic information from the portion of the profile associated with the current content being presented, in order to correlate the profile with the one of the residents in the particular resident group.

As an option, the machine learning model may further predict any additional residents that are consuming the television service on the television device. For example, the additional residents may not necessarily correspond to the profile of the login used to access the television service. This prediction may be made based on location information derived for the television device, as well as the content being presented on the television device corresponding to information known for the additional residents (e.g. type of content historically consumed, demographics, etc.).

In one embodiment, the additional residents may be predicted as consuming the television service on the television device by 1) determining which logins have been historically used to access the television service on the television device, 2) predicting a location in the residential space in which the television device is located, based on the determination of which logins have been historically used to access the television service on the television device, and 3) predicting any additional residents of the plurality of residents that are consuming the television service on the television device, based on the location in the residential space in which the television device is predicted to be located.

As a further option, location data derived for the residents may be used to predict which residents are consuming the television service on the television device. For example, location data for mobile devices of the residents may be collected (e.g. using GPS, a smart home gateway described below, etc.), where each mobile device is assigned (by the CSP) to a specific resident. The location data may also be input to the machine learning model to predict the one or more residents of the plurality of residents that is consuming the television service on the television device. For example, residents with a mobile device in a same location (e.g. room of the residential space) as the television device may be predicted as consuming the television service, whereas residents with a mobile device not in a same location as the television device, and especially not in the residential space entirely, may not be predicted to be consuming the television service. This information may also be used to understand which profile belongs to which resident. Just by way of example, each time a certain profile does a login, and it is determined that a certain person is always in the area at the time of the login, then due to location it may be determined that the certain person is the one with that login.

In one embodiment, the prediction of which residents are consuming the television service on the television device may be used for content targeting purposes. For example, content may be targeted to those residents based on information known about the residents (e.g. demographic information, etc.) as well as information associated with the current content being presented through the television service. In one embodiment, the prediction of which residents are consuming the television service may be input as an addition feature to an existing content targeting machine learning model to select content that is to be targeted to those residents. The content being targeted may include an advertisement, a content recommendation (e.g. new television program), or an offer for a product or a service (e.g. of the CSP).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

It is desirable to know who is watching the television at any given point in time. This information may be used in order to supply services to that person, to give the relevant advertisement, etc. The more accurately a prediction can be made as to which person is watching television, the more accurate content targeting can be.

Sometimes when people receive television services they also login to a particular account. When they login, they see the television programs recommended to them, as well as other services tailored for them, such as remembering what they have seen in the past, etc. However, while the account used to login can be determined, existing techniques do not consider exactly which person is consuming the television services, including when it is unknown which person is associated with a particular login and especially where a login account is associated with multiple people (e.g. a family).

For a television device with a television application or a STB provided by the CSP, the CSP is able to determine whether a customer is home and information defining the family of the customer, whether someone is currently watching one or more television devices within the home and which television content is being watched, and which login was used to access the television service.

Embodiments described herein are able to assign a login profile to a specific resident or a specific group of residents (e.g. children). If the login profile belongs to multiple residents, estimate if one resident is watching the television device or multiple residents are watching the television device. If the login profile belongs to one person, estimate any additional residents are also watching. Once it is predicted which residents are consuming the television content through the television service, content targeted can be provided for those residents.

Figure 2:
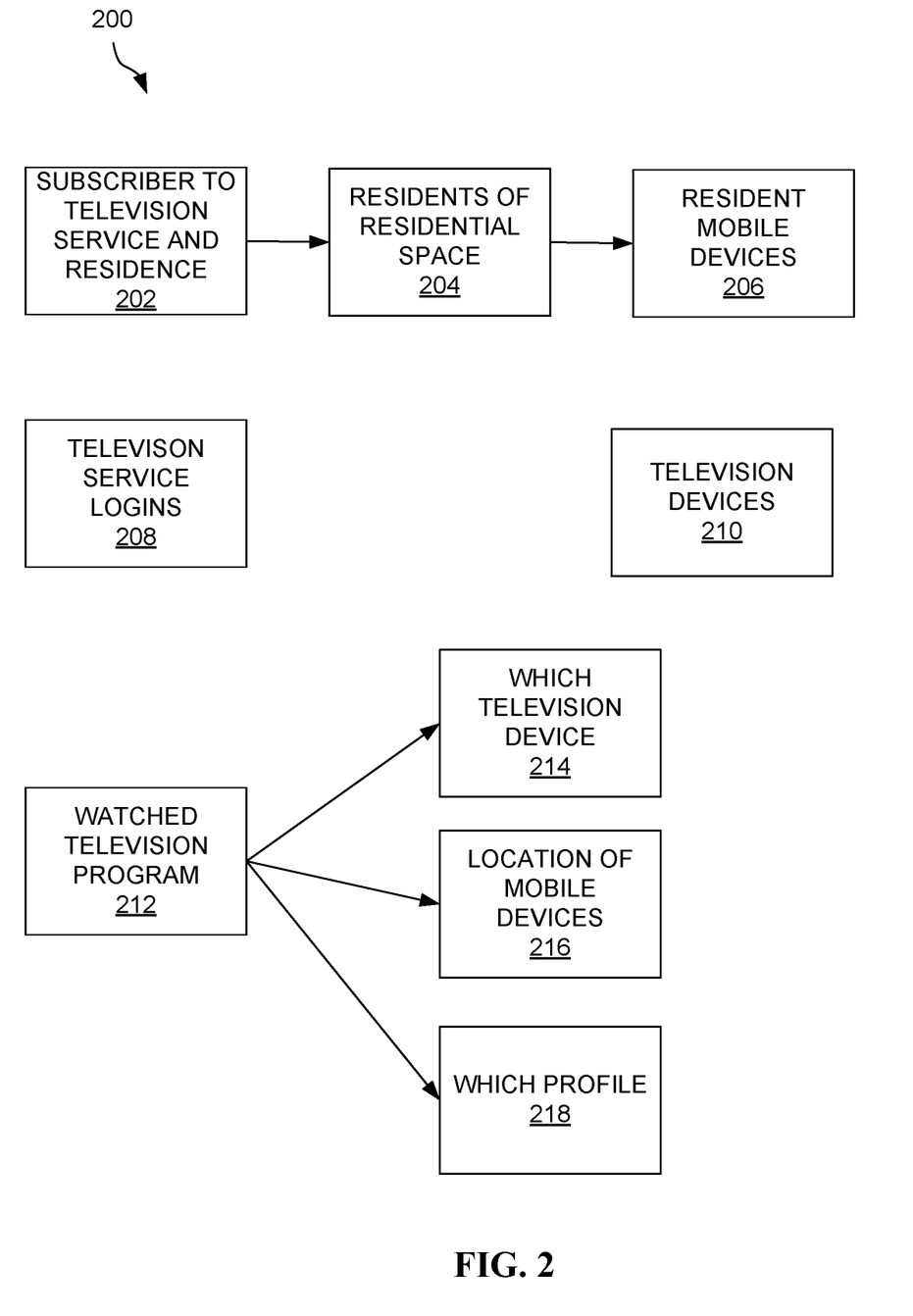
FIG. 2 illustrates a block diagram of a method for collecting data to be used for predicting which resident of a residential space is watching television, in accordance with one embodiment.

FIG. 2 illustrates a block diagram of a method 200 for collecting data to be used for predicting which resident of a residential space is watching television, in accordance with one embodiment. As an option, method 200 may be carried out in the context of the details of the previous figure and/or any subsequent figure(s). Of course, however, the method 200 may be carried out in the context of any desired environment. Further, the aforementioned definitions may equally apply to the description below.

As shown, for a subscriber to a television service and their residence 202, residents 204 of the residential space are determined. Then, mobile devices 206 of those residents are determined.

Further, logins to a television service 208 and their corresponding profiles are determined. Television devices 210 of the residential space are also determined.

Still yet, for each television program 212 watched via the television service, multiple data is collected. This data includes which television device was used 214 to watch the television program 212, locations of the mobile devices 216 during the television program 212, and which login 208 and corresponding profile 218 were used to access the television service to watch the television program 212.

All of this data collected in method 200 may then be input to a machine learning model to predict which resident of a residential space is watching television.

Exemplary Embodiments of Data Collection

Who arrives/appears at home (see the devices associated with that person being activated).

How many people (e.g. Wifi connected smartphones) e.g. at home, and/or cross this information with network usage patterns. For example, if someone is not on the Wifi but activity started on the television or personal computer or other computing device, then someone is at home.

Determine when someone is busy watching something on his device (e.g. streaming television content) or playing a video game or maybe doing something else based on the pattern of usage of the network on his device. This shows that not only he at home, but also that he is busy or not in some attention consuming activity.

When more than one gateway/access point exists, or a more advanced mesh architecture, estimate if people are in the same area or floor. Assign people to a room or a floor according to the access point and their mobile devices. If a resident is estimated to be on the second floor, he is less likely to be looking at a television device on the first floor. We can know on which floor the television device is located by looking at the usage pattern of it.

If someone is at home but using personal computer (PC), which may be determined based on network pattern, it may help to estimate if he is part of the group that is currently watching a television device. If a resident playing a game on computer, he is likely not focusing on the television device.

Determine if a television device was turned "on" and when, based on network traffic (although this information can also be obtained from the media side at the CSP). If someone moves the set-up-box connected to a television device to a different physical location, this may be determined as well.

Figure 3:
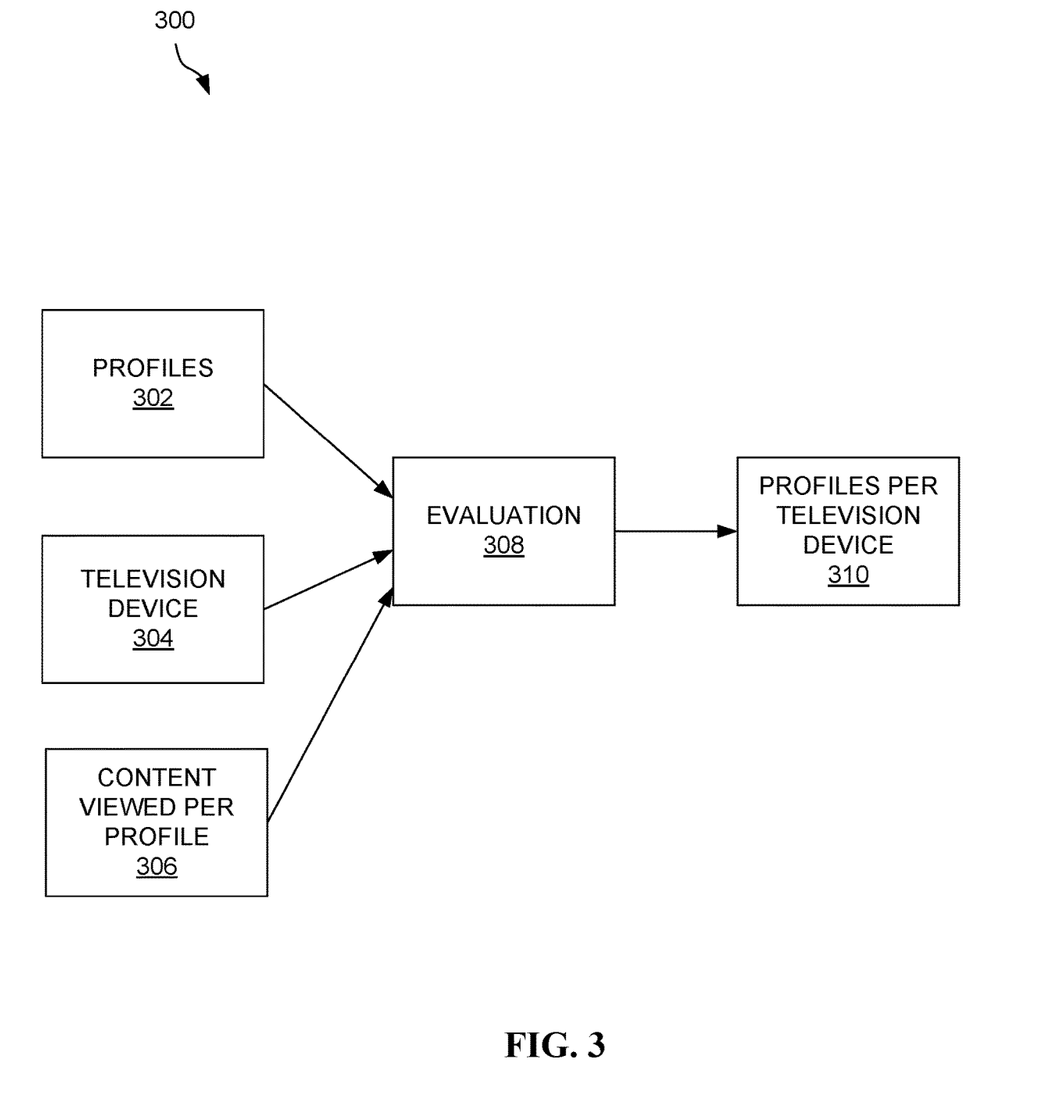
FIG. 3 illustrates a block diagram of a method for assigning profiles to television devices, in accordance with one embodiment.

FIG. 3 illustrates a block diagram of a method 300 for assigning profiles to television devices, in accordance with one embodiment. As an option, method 300 may be carried out in the context of the details of the previous figure and/or any subsequent figure(s). Of course, however, the method 300 may be carried out in the context of any desired environment. Further, the aforementioned definitions may equally apply to the description below.

As shown, profiles 302 for television service logins, information on television devices 304, and an indication of the content viewed per profile 306 is input to an evaluation module 308. The evaluation module 308 is a computer program that evaluated the input data to determine, for each of the television devices 304, which of the profiles 302 have historically used the television device for accessing the television service.

Figure 4:
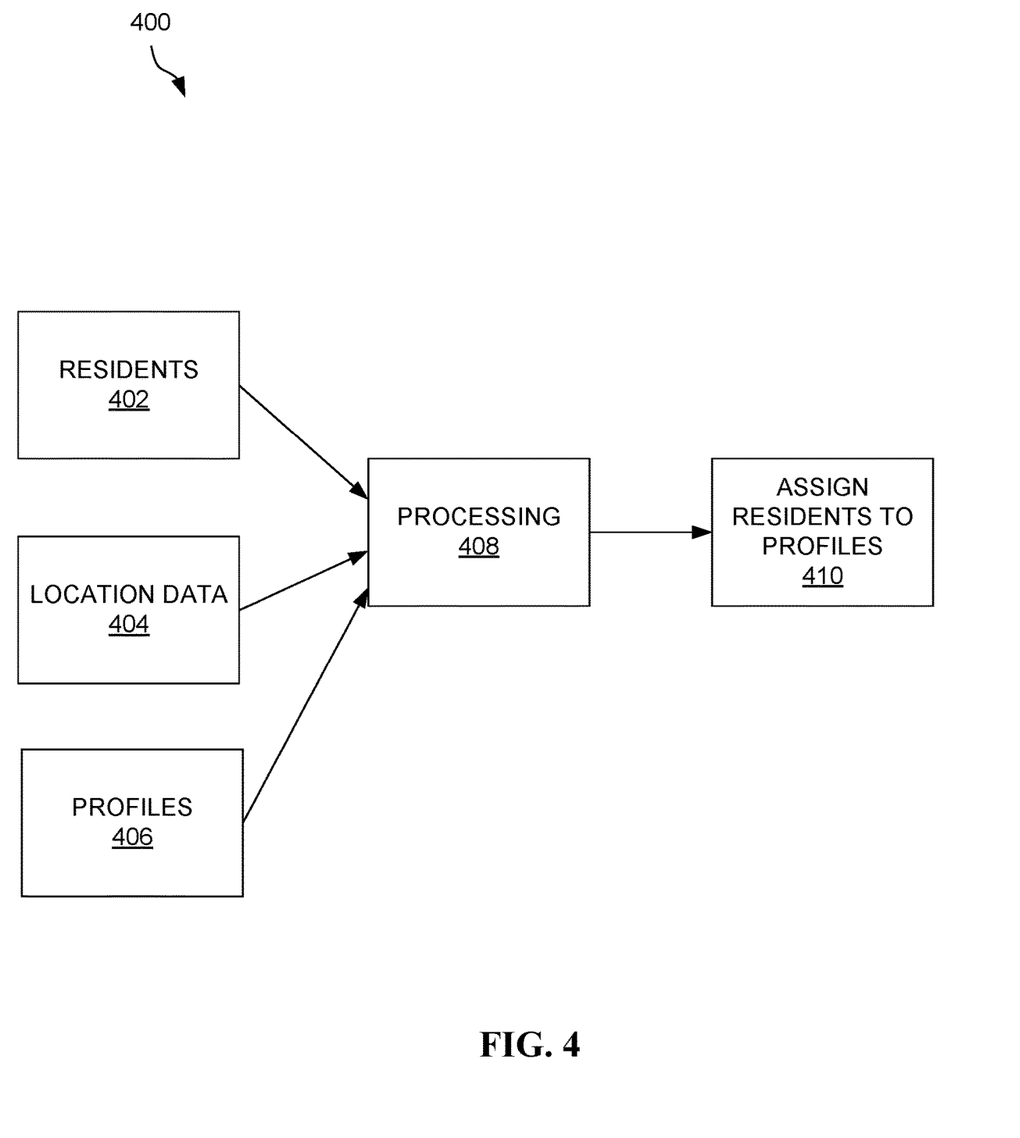
FIG. 4 illustrates a block diagram of a method for assigning residents to profiles, in accordance with one embodiment.

FIG. 4 illustrates a block diagram of a method 400 for assigning residents to profiles, in accordance with one embodiment. As an option, method 400 may be carried out in the context of the details of the previous figure and/or any subsequent figure(s). Of course, however, the method 400 may be carried out in the context of any desired environment. Further, the aforementioned definitions may equally apply to the description below.

In the present embodiment, particular residents of the residential space can be assigned to particular profiles generated for logins to the television service. As shown, information on the residents 402, location data 404 for their mobile devices, and the profiles 406 are input to a processing module 408. The processing module 408 is a computer program that processes the input data to assign each of the residents 402 to one or more of the profiles 406.

In particular, the profiles 406 may be used to determine a demographic of a person associated with the profile. The location data 404 may be used to determine which of the residents is home. Residents determined to be home and having demographic information 402 matching the demographic associated with the profile 406 may then be assigned to that profile 406.

EXEMPLARY EMBODIMENTS

Information Known by the CSP

The CSP stores information on the residents of a residential space that subscribes to a television service (i.e. home users). The CSP may also know family status and names of spouse, how many children, age, gender, etc. The family members may have a phone each (if not too young) and the CSP may be the provider of the phones and phone service as well (e.g. via a family plan). The information known about the residents can also be improved by scraping social media and any other sources.

When television service is used, this use may be detected by the CSP. If more than one television is used for the television service, the CSP may also know which content is consumed on which television. Further, the CSP may know which login was used for which content.

Assigning a Login to a User or to a Group of Users

For each login, the watching profile of this login is determined. Based on the profile, it can be estimated with high likelihood, the demographics of the person that used the login to access the television service (e.g. if male, female, adult, child, teenager, etc.). If there is only one resident that matches the demographics, the name of that resident is attached to that profile. Notice that the login could be one arbitrary identifier, whereas the connected name could be an actual resident name.

If there are less profiles than residents of the residential space, it is likely that multiple residents use a same profile. This may be especially true for kids. So if the profile characteristics are child but both male and female, it may be assumed which children in the family are using the same profile.

The CSP may also have access to location information of the mobile devices of the residents. This allows the CSP to determine which residents are located in the house. If a resident is not in the house, and a profile is used, it is less likely to be that resident using the profile.

Estimate Who is Watching if the Login Belongs to Multiple People

For a login that is assigned to multiple residents, as described above, the residents could be very similar (e.g. two boys of similar age). In this case, the CSP may have very hard time to know which of the residents is consuming the television service using that login. However, this may not be of importance to the CSP because the services the CSP wants to offer (e.g. content targeting) will be about the same.

However, if the residents have very distinct taste (e.g. one likes nature the other comics), the CSP may create two clusters from one login. If they have multiple television devices, it makes it easier as likely a resident could be often be assigned to a particular login/television device combination.

If there are two residents with distinct tastes using a single login, any given content program may be assigned to a specific resident by correlating the content being viewed with the demographics of the person. For example, assume there are three people and two logins. The people are 21-year-old male, 18-year-old male, and 16-year-old female. Assume a specific login is assigned to the 21-year-old male, and a second login is assigned to the two younger people. The two younger people may have two different patterns. When someone using that login is watching football (one of the patterns), this profile may then be assigned (for the time being) to the 18 year old male. If someone is watching the history channel, and it is the second pattern for the login, this profile may then be assigned to the 16-year-old female.

Estimating Additional Viewers

If there are multiple television devices, then there are likely some that are in private rooms and some that are in the living room of a resident space. If only one login is commonly associated with a television device, it can be assumed it is located in a private room. If two adults' profiles are associated with a television device and there are two adults in the house, it can be assumed the television device is in their bedroom. If multiple logins are associated with a television device, it can be assumed the television device is in the living room.

Given a television device, the CSP can determine which resident is watching, and can also figure out any other residents that can potentially be in the same room as the television device. Those are the others that use this television device from time to time. When a resident is watching, it can be determined whether the program watched fits the profile or if it does not fully fit. If it does not fully fit, it can be determined if the program corresponds with some other profiles which may indicate that more than one resident is watching, as well as which resident is watching.

Using Location Data

When mobile device data is available, which includes location data, it can be determined which resident, from the household members, is home. This information can be used to eliminate some people from being predicted as consuming a television service at any point in time. For example, if there is a login that belongs to multiple people and some of them are not home, this can reduce the choice of which residents are using the login. If more than one resident may be watching a show, location information will help to figure out the relevant choices of which residents are watching.

Action

After it is predicted which resident(s) is actually watching the television device, not only generics but likely an indication of the specific person, certain actions can be customized to the information. The actions can include making a recommendation, providing better services, and/or providing more focused advertisements. This information can be used to select advertisements for example when we calculate which advertisement is more relevant. This may in turn improve the monetization of advertisements, by more accurate selection of advertisements in the model where the pay is per click or other viewer actions.

Smart Home Gateway

It is possible that a Smart Home Gateway exists within the resident space. Smart home gateways are a smarter version of standard CSP home gateway/router. By Smart, it means that there is much more visibility (AI based) to who's using what device at home, which means that the router knows the home members, what they are doing on the internet (to some extent), and maybe where they are located. For example, if a device, such as a smart phone, is defined (via a wizard) as belonging to some person, and it is known where the device is (or partially know as in which repeater it uses), in which room, then with a high likelihood the location of the person in the home can be derived.

If a smart home gateway exists, and supplied by the CSP also providing the television service and mobile phone services, then this information can also be used to improve the accuracy of the predictions of which resident is consuming a television service, as described in the embodiments above.

Figure 5:
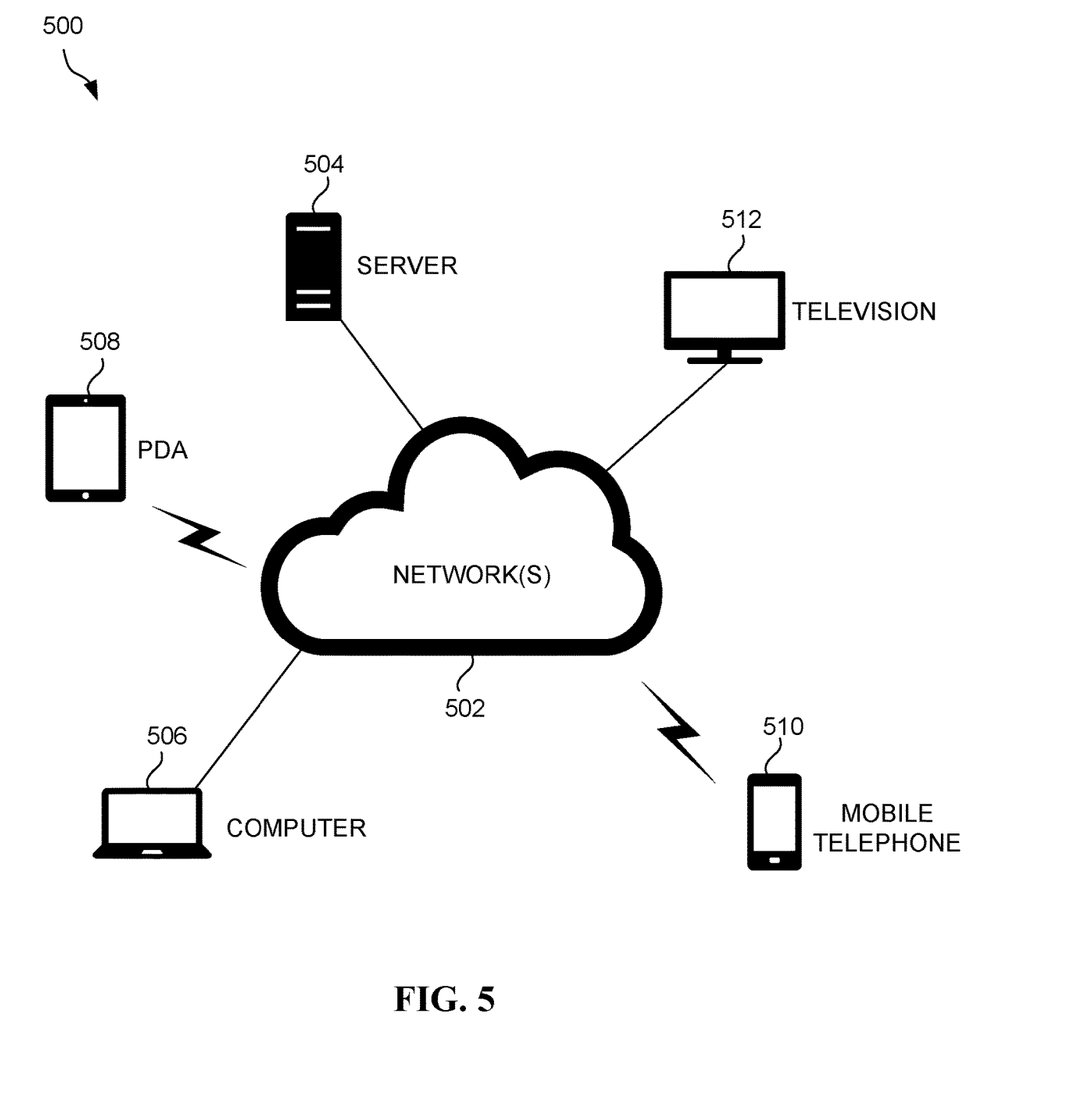
FIG. 5 illustrates a network architecture, in accordance with one possible embodiment.
Figure 6:
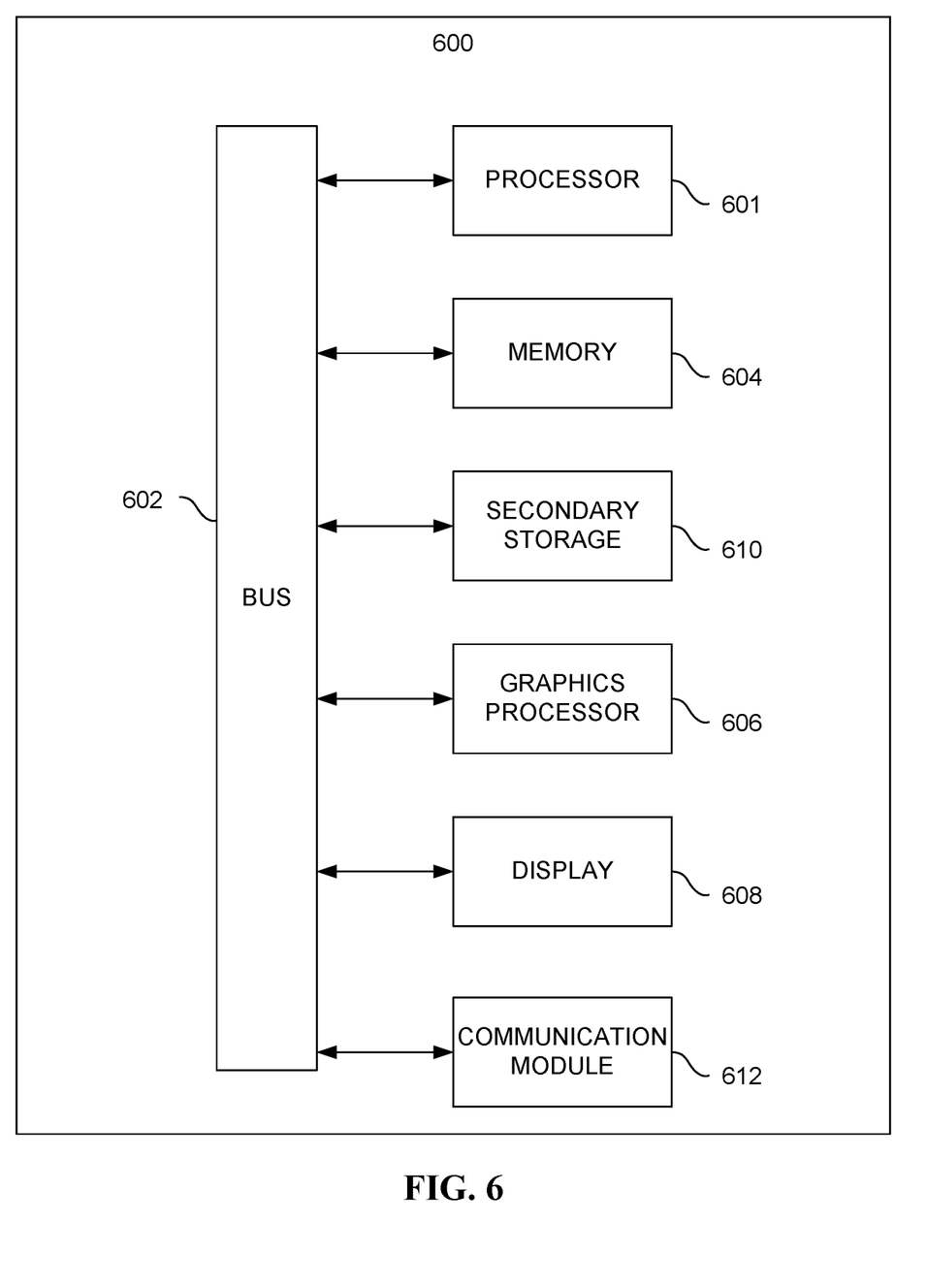
FIG. 6 illustrates an exemplary system, in accordance with one embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    detecting a login to a television service on a television device in a residential space;
    identifying information defining a plurality of residents of the residential space;
    identifying a profile determined for the login, wherein the profile indicates a history of content viewed using the login to the television service;
    inputting the profile and the information defining the plurality of residents of the residential space to a machine learning model that predicts one or more residents of the plurality of residents that is consuming the television service on the television device and that assigns the login to the one or more residents of the plurality of residents that is consuming the television service on the television device.

2. The non-transitory computer readable medium of claim 1, wherein the television service is provided by a communication service provider (CSP), and wherein the method is performed by the CSP.

3. The non-transitory computer readable medium of claim 2, wherein the login is performed through a television application or a set top box (STB) associated with the CSP.

4. The non-transitory computer readable medium of claim 2, wherein at least a portion of the information defining the plurality of residents of the residential space is stored by the CSP.

5. The non-transitory computer readable medium of claim 2, wherein at least a portion of the information defining the plurality of residents of the residential space is collected from one or more third party web sites.

6. The non-transitory computer readable medium of claim 1, wherein the information defining the plurality of residents of the residential space includes:
    an identifier of each resident of the plurality of residents,
    an age of each resident of the plurality of residents, and
    a gender of each resident of the plurality of residents.

7. The non-transitory computer readable medium of claim 1, wherein the machine learning model derives demographic information from the profile to correlate the profile with the one or more residents.

8. The non-transitory computer readable medium of claim 1, further comprising:
    collecting location data for a plurality of mobile devices of the plurality of residents, wherein each mobile device of the plurality of mobile devices is assigned to a resident of the plurality of residents.

9. The non-transitory computer readable medium of claim 8, wherein the location data is further input to the machine learning model to predict the one or more residents of the plurality of residents that is consuming the television service on the television device.

10. The non-transitory computer readable medium of claim 1, further comprising:
    targeting content to the one or more residents of the plurality of residents that is predicted to be consuming the television service on the television device, wherein the content includes at least one of an advertisement, a content recommendation, or an offer for a product or a service.

11. The non-transitory computer readable medium of claim 1, wherein identifying information defining a plurality of residents of the residential space includes accessing information known about each resident of the plurality of residents of the residential space.

12. A method, comprising:
    detecting a login to a television service on a television device in a residential space;
    identifying information defining a plurality of residents of the residential space;
    identifying a profile determined for the login, wherein the profile indicates a history of content viewed using the login to the television service;
    inputting the profile and the information defining the plurality of residents of the residential space to a machine learning model that predicts one or more residents of the plurality of residents that is consuming the television service on the television device and that assigns the login to the one or more residents of the plurality of residents that is consuming the television service on the television device.

13. A system, comprising:
a non-transitory memory storing instructions; and
one or more processors in communication with the non-transitory memory that execute the instructions to perform a method comprising:
    detecting a login to a television service on a television device in a residential space;
    identifying information defining a plurality of residents of the residential space;
    identifying a profile determined for the login, wherein the profile indicates a history of content viewed using the login to the television service;
    inputting the profile and the information defining the plurality of residents of the residential space to a machine learning model that predicts one or more residents of the plurality of residents that is consuming the television service on the television device and that assigns the login to the one or more residents of the plurality of residents that is consuming the television service on the television device.

* * * * *